United States Patent [19]
Chiou

[11] 4,229,885
[45] Oct. 28, 1980

[54] STRUCTURE OF VERTICAL AND HORIZONTAL SURVEYING INSTRUMENT

[76] Inventor: Chuang-Min Chiou, No. 415, Yung An Rd., T'ao Yuan, T'ao Yuan City, 330, Taiwan

[21] Appl. No.: 22,495

[22] Filed: Mar. 21, 1979

[51] Int. Cl.³ .............................................. C01C 9/04
[52] U.S. Cl. ...................................... 33/376; 33/347; 33/401
[58] Field of Search ................. 33/347, 376, 391, 395, 33/401

[56] References Cited
U.S. PATENT DOCUMENTS

| | | | |
|---|---|---|---|
| 1,667,840 | 5/1928 | Colvin | 33/401 X |
| 1,804,490 | 5/1931 | Bagge | 33/401 X |
| 2,216,086 | 9/1940 | Meenan | 33/401 X |
| 2,708,317 | 5/1955 | Warne | 33/347 |
| 3,225,451 | 12/1965 | Olexson et al. | 33/347 |

*Primary Examiner*—Charles E. Phillips
*Attorney, Agent, or Firm*—Robert E. Burns; Emmanuel J. Lobato; Bruce L. Adams

[57] ABSTRACT

A level for use in taking level readings on vertical and horizontal surfaces. The level has a case within which an enclosure with some instrumentation is disposed in a vertical position for taking level readings on vertical or horizontal surfaces. The instrumentation has a gravity-responsive weight pendulum mounted on a knife-edge pivot supported on an edge contact with its pivot. The pendulum has an actuating pivot having two flat sides fixed at an upper end for engaging two knife-edge pivots on a pointer which is actuated laterally by the pendulum proportionately to the extent a surface being read is out of the vertical or horizontal. The pointer is likewise pivotally supported on an edge supported on a supporting knife-edge pivot.

4 Claims, 5 Drawing Figures

STRUCTURE OF VERTICAL AND HORIZONTAL SURVEYING INSTRUMENT

BACKGROUND OF THE INVENTION

In conventional construction, a plumb line or bubble level is used for vertical surveying. However, a plumb may swing and it will be still in calm air for which a certain period of waiting has to elapse. And it will be accurate only in such a situation. A bubble level is not precise enough and it can only be used as a rough reference. The scope of application is limited and it should not be used in high building construction. These are the known disadvantages of conventional vertical and horizontal surveying instruments.

SUMMARY OF THE INVENTION

The invention relates to a new structure of vertical and horizontal level instrument, especially one which indicates deflection by means of a double lever linkage mechanism precisely.

The major objective of the invention is to provide a new type of vertical level instrument of high precision which can indicate deflection of unit distance and distance directly so that application of the vertical level instrument is simplified.

Another objective of the invention is to provide a closure comprising a precise double lever linkage mechanism and by simply inserting the closure in the shell or case having the level surfaces reading, it can be used as a horizontal level instrument.

BRIEF DESCRIPTION OF THE DRAWINGS

The level according to the present invention can be readily understood in conjunction wiht the appended claims and drawings, in which:

DESCRIPTION OF THE PREFERRED EMBODIMENT

Figure 1:
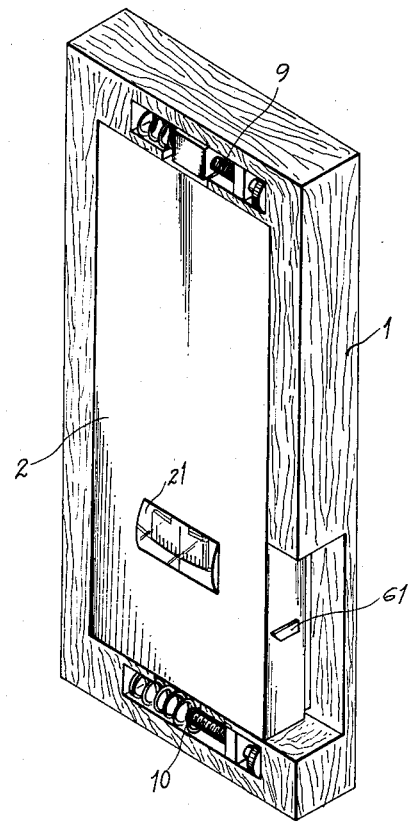
FIG. 1, is a perspecitive view of the level, according to the invention, in readiness for vertical level readings.
Figure 2:
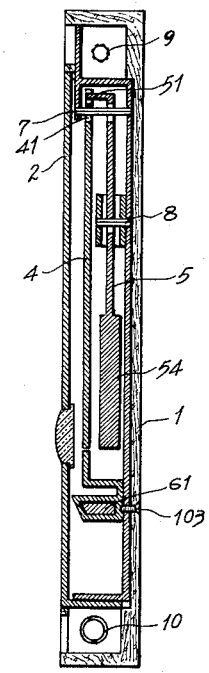
FIG. 2, is a vertical median cross section view of the level in FIG. 1.
Figure 3:
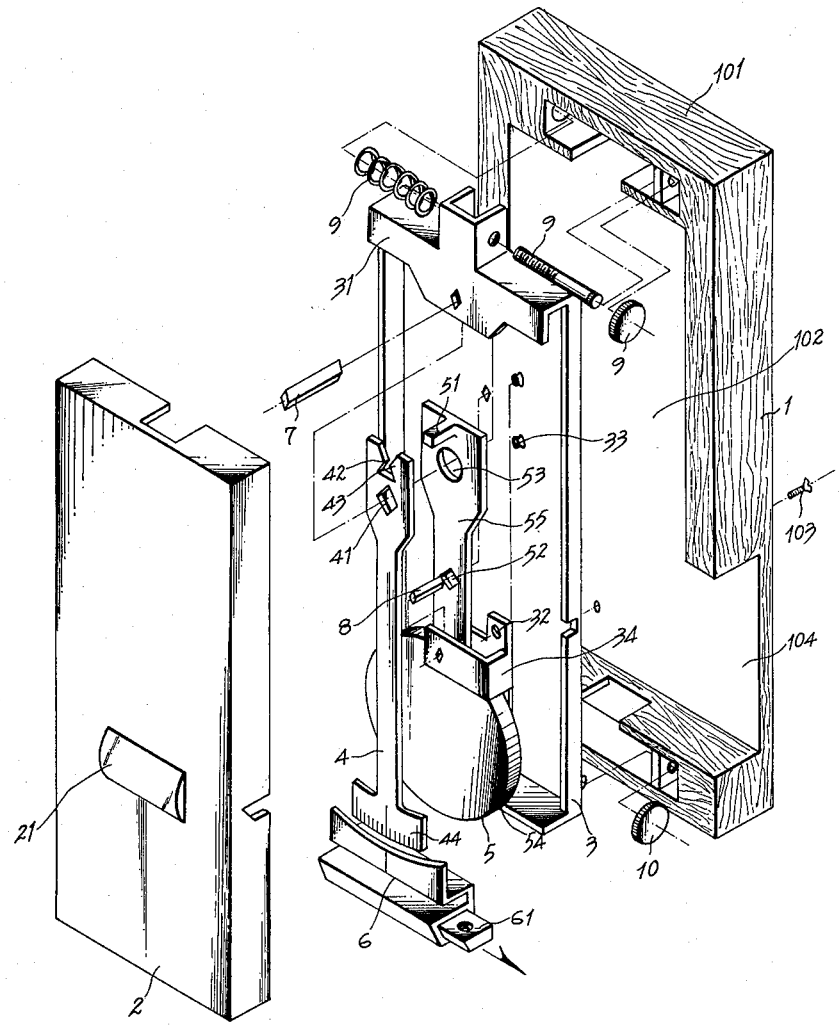
FIG. 3 is an exploded view of the level in FIG. 1.
Figure 4:
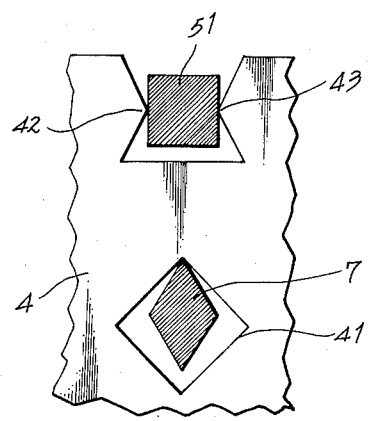
FIG. 4 is a fragmentary detail view on an enlarged scale of a part of pivot structures according to the invention.

As shown in the attached drawings, the invention comprises a case (1), front and rear covers (2) (3) of a closure, an indicating pointer or needle (4), a weight (5), indicating board (6), a pointer or needle spindle (7) and a weight spindle (8). The case (a) is a thick rectangular plate (101) with a rectangular chamber or recess (102) at its middle. The plate (101) and rectangular recess, (102) surfaces should be well finished and flat. The plate (101) is made of hard wood, plastic or any other suitable material. Within the rectangular chamber or recess (102) a closure is placed. The closure is fixed by a front cover (2) and rear cover (3) (or tightened with screws), or with screws (103) through the rear cover (3) on the case (1). Within the closure a weight (5) and an indicating needle, which form a double lever linkage mechanism, are installed. A hole is provided on the lower margin of the front cover (2) for holding a convex lens (21). Through the convex lensindication of deflection by the indicating pointer or needle (4) relative to the indicating board can be viewed. The upper end of the rear cover has an "L" shape (31) for holding the needle spindle (7) and the indicating needle (4). On the lower end of the rear cover a fixing support (34) is riveted for holding the weight spindle (8) and weight (5). At the upper, lower and internal side of the shell (1), an adjusting spring (9) and a screw (10) are installed for adjustment of error on the instrument The indicating board (6) may have a single scale or vernier scale on its center to indicate deflection of the needle (4). There is a square hole (41) at the upper end of the needle (4) for hanging it on the needle spindle (8). At the upper end there is a "⋈" groove (42) for engaging with weight (5) at the square projection (51) of the weight (5). The square projection (51) can be fixed between the two flange points of the groove (42) as shown in FIG. 4. The scale, board is placed below the indicating needle (4). On the board scale is found a reference mark a ratio exist between distance ($L_1$) from the square hole (41) to the upper end and a distance ($L_2$) from the square hole (41) to the lower end which is 1:20 or more which gives higher precision in indication of deflection.

The indicating needle has the square mounting hole (41) and indicating needle spindle (7) is a lozenge spindle. So that pivot of the indicating needle (4) is at precise position and the needle swings precisely. The weight (5) has a same hole and the weight spindle (8) has a same structure too. The "⋈" like groove on the upper end of the indicating needle (4) enables the square projection (51) to be fixed at the two points (43) of the groove so that the needle can swing precisely. A round hole (53) is a space for passing the needle spindle (7) and then, the weight can swing freely.

The weight (5) comprises a pendulum (54) and a support (55). The square hole (52) is at its center for holding the weight spindle. A ratio between a distance ($L_3$) from the square hole (52) to the upper end and a distance ($L_4$) from the square hole (52) to the lower end can be set as 1:1 or other direct ratio.

As shown in the drawings, $L_1:L_2$ is a lever of 1:20 and $L_3:L_4$ is a lever of 1:1. Then, if pendulum the (54) of weight swing 0.5 mm rightward (or leftward), then the lower end of the indicating needle swings 10 mm rightward (or leftward). Therefore, a precise deflection can be indicated by the double lever linkage mechanism.

Let $L_3=50$, x=height (height of the measured surface)
$L_1:L_2=50:x$, $1:20=50:x$, $x=1000$.

Thus, the precision of the invention is one thousandth.

The invention can be accompanied with a chart which shows deflection distance in a graduated scale so that the user can know the actual deflection distance directly. Furthermore, the invention can be used together with a longer "⊓" frame and foldable "⊓" frame which eases surveying work.

Figure 5:
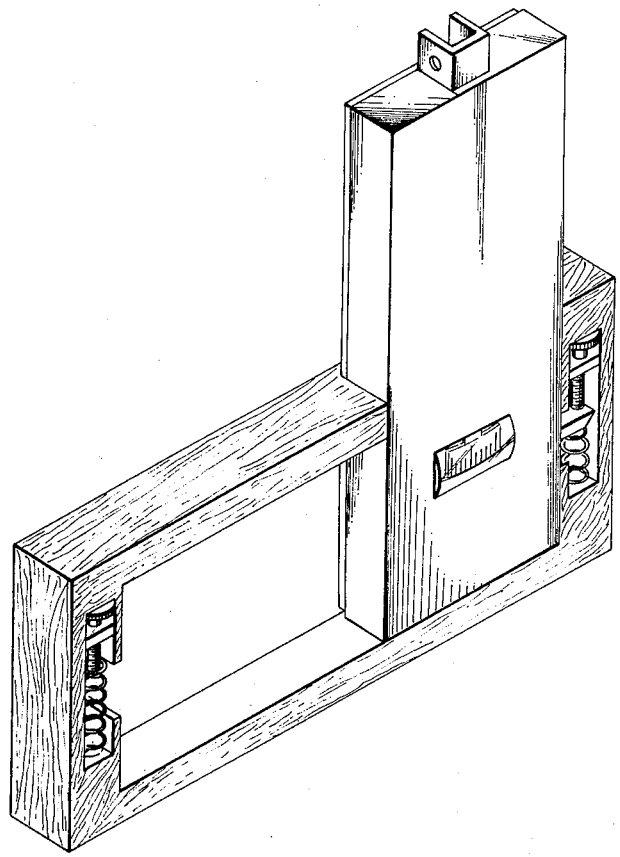
FIG. 5 is a perspective view of the same level in FIG. 1 in readiness for horizontal level readings.

Fixing screw (103) for the invention is installed at the lateral opening (104) of the shell or case (1) and the middle of rectangular chamber (102) so that the closure consisting of the front cover (2) and the rear cover (3) can be removed from the rectangular chamber (102) and placed horizontally instead of vertically, to form an instrument as shown in FIG. 5. In this arrangement, the screw (103) can be used for fixing too. An adjustable block (61) is designed at the bottom of the indication board (6). It is pulled out, toward the lower and inner side of the shell, it functions as an adjusting assembly together with screw and spring there for correcting error which may occur after the closure in laid horizontally. Then, the invention is a horizontal surveying instrument and the longer side of shell (1) is used for level surveying. Adjustment is carried out very simply.

In conclusion, the invention consists only of a few elements. Its production, carrying and application are convenient. And it is a precise instrument too.

We claim:

1. A level for determining whether surfaces are in horizontal and vertical planes comprising; an outer case having an internal space for removably mounting therein some instrumentation for use of the level in gauging horizontal surfaces and vertical surfaces, the case having outer flat surfaces disposed in intersecting planes at ninety degrees to each other for respectively contacting vertical and horizontal surfaces on which level determinations and readings are to be made, said case being open to said space at one major side thereof and having a lateral opening along a side edge thereof open to side space; an enclosure mounting therein instrumentation and insertable alternatively into said space through said open major side for taking vertical readings with the level and insertable into said space through said lateral opening into said space for placing of the case in a horizontal position for taking horizontal readings with the level; said instrumentation being disposed in said enclosure comprising a gravity-responsive depending pendulum having a weight on a free end thereof, means to pivotally mount the pendulum for movement laterally in a plane, a pivot for said depending pendulum for having the pendulum in a depending position when taking readings on vertical and horizontal surfaces, and indicating means having a scale indicia representative of the weight position relative to the vertical for indicating jointly with the weight deflection of the pendulum relative to an exactly vertical plane thereby to indicate how much a vertical surface or a horizontal surface respectively is out of verticality or out of level, said indicating means comprises a pivoted depending pointer coactive with the pendulum and displaced by said pendulum from the vertical proportionately to any displacement the pendulum indicates a surface read varies from the vertical or from the horizontal, said pendulum comprises a pivot for said pointer fixed on an upper end thereof and having two oppositely disposed flat sides, said pointer having two knife-edges defining oppositely flat sides, said pointer for defining lateral pivoting of the pointer laterally under control of the pendulum to an extent a surface being read is not a plane parallel to said flat sides.

2. A level according to claim 1, including a fixed support pivot having a supporting knife-edge pivot on which said pointer is supported in a depending position, and said pointer having a supporting edge surface thereon riding on said supporting knife-edge pivot.

3. A level according to claim 2, in which said supporting knife-edge pivot is below said two knife-edge pivots and is located in a plane intermediate said two-knife edge pivots.

4. A level according to claim 3, in which the pointer has a length in which the distance from said supporting knife-edge pivot is about to an upper end and the distance to a lower end thereof has a ratio of about 1:20.

* * * * *